(12) United States Patent
Cocksedge et al.

(10) Patent No.: US 7,314,016 B2
(45) Date of Patent: Jan. 1, 2008

(54) METHOD OF TOWING AND INSTALLING A PIPE

(75) Inventors: Brian Cocksedge, Tynemouth (GB); Justin Tuohy, Kilcolgan (IE)

(73) Assignee: Wellstream International Limited, Newcastle Upon Tyne (GB)

( * ) Notice: Subject to any disclaimer, the term of this patent is extended or adjusted under 35 U.S.C. 154(b) by 93 days.

(21) Appl. No.: 10/502,552

(22) PCT Filed: Jan. 23, 2003

(86) PCT No.: PCT/EP03/00575

§ 371 (c)(1),
(2), (4) Date: Jul. 11, 2005

(87) PCT Pub. No.: WO03/062688

PCT Pub. Date: Jul. 31, 2003

(65) Prior Publication Data

US 2006/0150884 A1    Jul. 13, 2006

(51) Int. Cl.
*B63G 8/14* (2006.01)
(52) U.S. Cl. .................................... 114/244
(58) Field of Classification Search ................ 114/244
See application file for complete search history.

(56) References Cited

U.S. PATENT DOCUMENTS 4,110,994 A    9/1978    Lundh

FOREIGN PATENT DOCUMENTS

| EP | 1022501 | 7/2000 |
|----|---------|--------|
| GB | 1559657 | 1/1980 |
| GB | 2221276 | 1/1990 |

OTHER PUBLICATIONS

International Searching Authority—European Patent Office, "International Search Report," International Application No. PCT/EP03/00675, Apr. 24, 2003, 3 pages.

*Primary Examiner*—Jesús D Sotelo
(74) *Attorney, Agent, or Firm*—Klarquist Sparkman, LLP

(57) ABSTRACT

According to the present invention, a solution is provided whereby rather than directly towing a pipe (30) from a tug (11), a cable (23) is suspended between two surface vessels (10, 11), and it is from this cable (23) that the pipe (30) itself is suspended at a plurality of points. By means of this arrangement, stress and fatigue is absorbed by the cable (23) rather than the pipe (30), that the pipe (30) arrives at its installation point with a correspondingly smaller loss in fatigue life.

20 Claims, 5 Drawing Sheets

METHOD OF TOWING AND INSTALLING A PIPE

CROSS REFERENCE

This application is a United States national phase application of international patent application number PCT/EP03/00675, filed Jan. 23, 2003, which claims priority to Great Britain patent application number 0201759.8, filed Jan. 25, 2002 which priority is claimed.

This invention relates to a method of transporting a pipe through water and an apparatus for use in towing and installing a pipe.

In conventional pipe towing methods, a pipe is directly connected to a tug by a cable, and towed through the water, either on the sea surface, or more often below it, where it may be retained in position by means of weights, chains dragging on the sea floor, floats and lift producing elements such as hydrofoils. The drag induced by the pipe itself, and the various ancillary components provided to maintain its position in the water mean that the pipe itself and towing tether are under significant tension. Furthermore, the movement of the towing vessel on the surface as a result of the deliberate manoeuvring, wind, wave or current effects can exert further forces on the pipe. As a result of these unpredictable stresses, a proportion of the fatigue service life of the pipe can be used up before it even commences operation at its installation site.

One solution to the transportation of pipes at sea is known from UK patent application GB 0 124305.4 (Publication No. GB 2380747A), which discloses a configuration similar to that shown in FIG. 1. In this technique, there is provided a first surface vessel 10, a second vessel 11, and a pipe 30 disposed between the surface vessels. One end of this pipe is connected by a tether 20 to said first surface vessel, while the opposite end of said pipe 30 is connected by a second tether 21 to said second surface vessel 11.

In use, the first surface vessel 10 moves towards the intended destination of the pipe, such that the pipe 30 is towed towards its destination, while the second surface vessel 11 is manoeuvred so as to ensure the desired alignment of the pipe.

The pipe 30 may either be simply suspended between the two surface vessels, or provided with lift generating or buoyant elements, such that the position of the pipe in the water can be controlled. Furthermore, trailing elements such as chains or cables may be connected to the pipe, so as to exert a downward force on the pipe, such that it sinks until the said trailing elements trail on the sea floor, thus arresting the downward movement of the pipe, thereby further controlling the pipe's attitude in the water.

In the application of the above method, it will be clear that the pipe 30 will be subjected to a variety of forces, in a variety of planes and of a highly time variant magnitude. For example, changes in the relative positions of the two surface vessels 10 and 11, variations in the speed of the pipes movements and resulting changes in lift generated by lift generating elements, the effect of surface currents on buoyancy elements and the effects of irregularities in the sea floor on draping elements, may all result on forces being exerted directly on the pipe. As a result of these different forces, the pipe will be continually fatigued, such that arriving at its final destination, a substantial proportion of the pipes fatigue life may be found to have been exhausted.

According to the present invention from one aspect, there is provided a method of transporting a pipe through water, comprising the steps of;

i. connecting opposite ends of a towing cable to a first surface vessel and to a second surface vessel respectively, ii. connecting said pipe at a plurality of points along the length thereof to a plurality of points along the length of said cable, iii. displacing said first surface vessel and said second surface vessel towards the desired destination of said pipe, such that said cable and said pipe connected thereto are towed behind said first surface vessel towards said desired destination.

According to a development of this first aspect of the invention, the pipe is one of a plurality of pipes.

According to a further development of this first aspect of the invention the plurality of pipes are arranged in a vertical plane parallel to the direction of movement of said first surface vessel beneath said cable.

According to a further development of this first aspect of the invention said cable is one of a plurality of cables disposed in a horizontal plane, and wherein each of said plurality of pipes is associated with a corresponding one of said plurality of cables.

According to a further development of this first aspect of the invention said plurality of pipes is retained in the proper plane by means of a spreader element, to which each of said pipes is directly or indirectly connected.

According to a further development of this first aspect of the invention said pipe is suspended from said at least one cable.

According to a further development of this first aspect of the invention said cable passes through said at least one pipe.

According to a further development of this first aspect of the invention said cable is provided with an outer sheath.

According to a further development of this first aspect of the invention said cable is provided with at least one buoyant element along it length.

According to a further development of this first aspect of the invention said cable is connected to said first surface vessel by a tether.

According to a further development of this first aspect of the invention said tether is connected to said cable by a padeye or swivel connection.

According to a further development of this first aspect of the invention said pipe is connected to said first surface vessel by a tether.

According to a further development of this first aspect of the invention said tether is connected to said at least one pipe by a padeye or swivel connection.

According to a second aspect of the invention there is provided a method of installing a riser pipe according to the first aspect of the invention, and further comprising the step of sequentially disconnecting the or each connection between said pipe and said cable, starting with the connection nearest said first or said second surface vessel, such that one end of the riser gradually approaches the desired location, for example the sea floor.

According to a third aspect of the invention there is provided an apparatus for use in towing and installing a pipe, comprising a main cable, said cable having a plurality of support elements extending therefrom, said elements being provided with means adapted for securement to said pipe.

According to a development of this third aspect of the invention, said support elements comprise secondary cables and said securement means are adapted to be releasably connected with said pipe.

According to a further development of this third aspect of the invention. The apparatus further comprises a sleeve which is fitted around said cable and adapted such that said cable and said sleeve fit inside said pipe, said sleeve protecting said riser pipe.

According to a further development of this third aspect of the invention, said support elements are arranged such that said cable is maintained in a substantially coaxial configuration with said pipe along at least a part of the length of said pipe.

For a better understanding of the present invention as well as preferred and other embodiments thereof, references made by way of example to FIGS. 1 to 8, in which.

Figure 1:
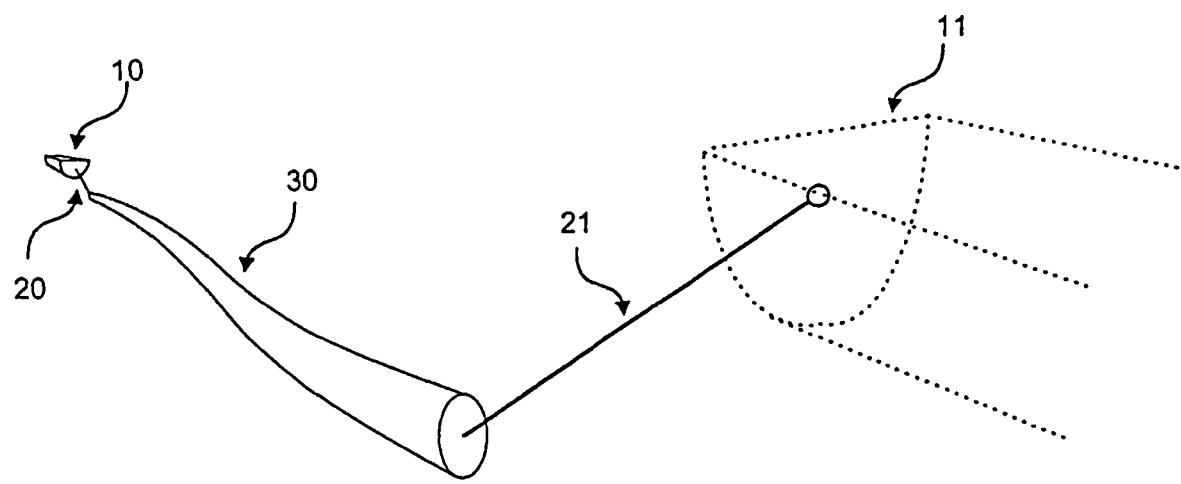
FIG. 1 is a perspective view showing a pipe towing method known in the prior art.
Figure 2:
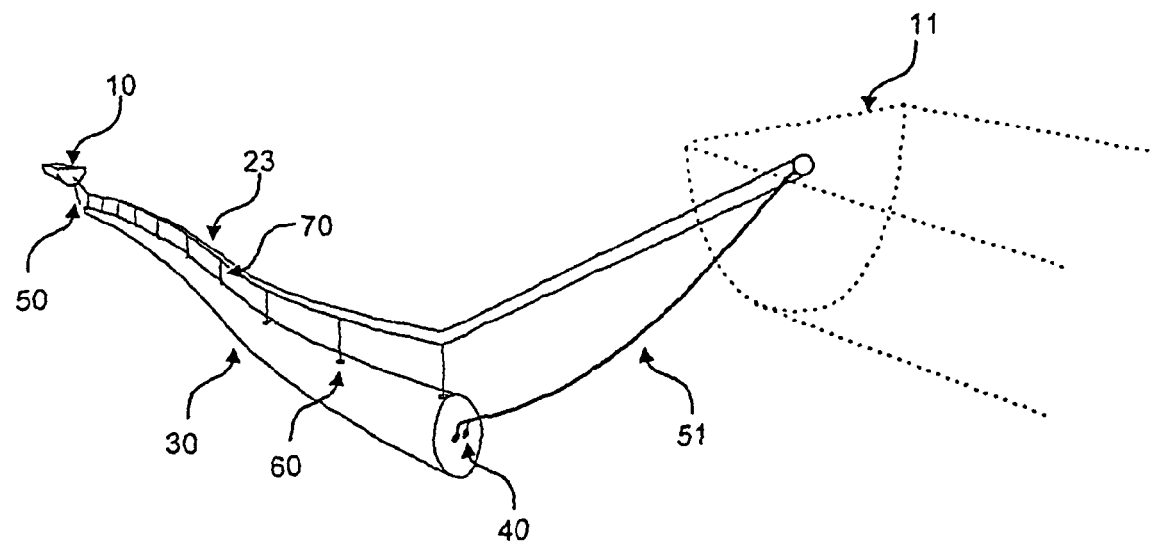
FIG. 2 is a perspective view of a first embodiment according to the present invention.

FIG. 2 shows a first embodiment of the present invention. In this embodiment, a cable 23 extends between a first surface vessel 10 and a second surface vessel 11. A pipe 30 is suspended from said cable 23 by tethers 70, which are provided with quick release connectors 60. Further tethers 50 and 51 are provided between the pipe 30 and the first surface vessel 10 and the second vessel 11 respectively. These further tethers 50 and 51 may be connected to the pipe 30 by means of pad eyes 40. A swivel may further be disposed between the pipe 30 and the further tether so as to reduce torsional forces on the cable and the pipe.

This arrangement has the advantage that forces arising from movements of the surface vessel are not directly transferred to the pipe 30, but rather to the cable 23.

Although according to the invention the tethers 50 and 51 are no longer under tension, they are preferably retained to assist monitoring of the towing process, and to prevent loss of the pipe in the event of damage or failure of one of more of the clamps attaching the pipe to the cable. The tethers or guide wires 50 and 51 may further be used by an ROV in transferring the control of the pipe to the installation vessel or host vessel.

The quick release connectors (60) may for example comprise collar mechanisms applied circumferencially to the external surface of the pipe.

Figure 3:
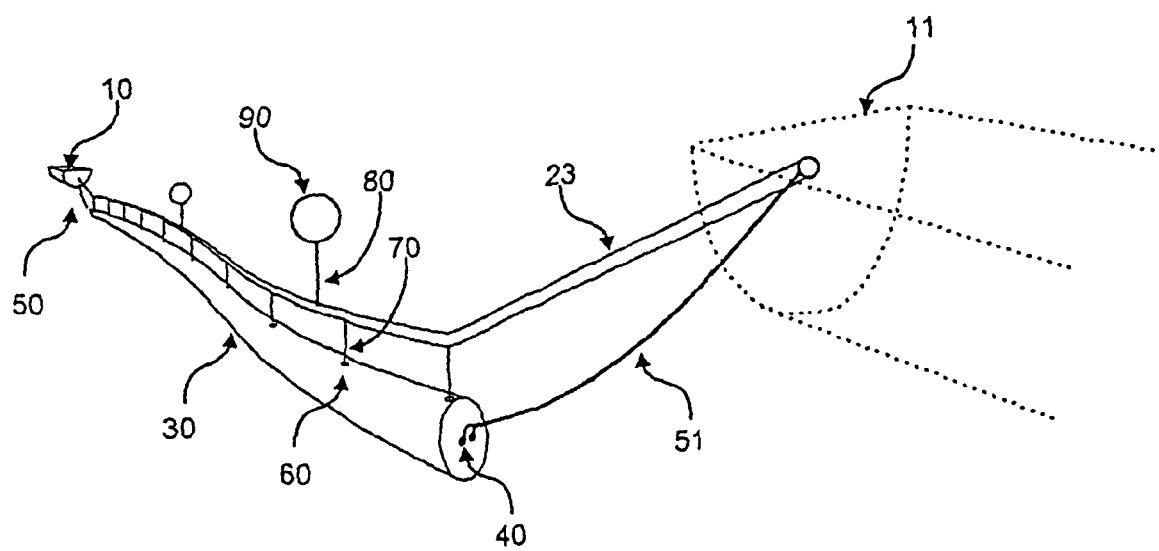
FIG. 3 is a perspective view of a second embodiment according to the present invention.

FIG. 3 shows a second embodiment according to the present invention. This embodiment has all of the elements of the first embodiment of the present invention, and additionally is provided with buoyancy elements 90 which are connected to said cable 23 by means of tethers 80.

The present invention is applicable to pipes of any length, and furthermore to a plurality of pipes of different lengths. In the case of a riser pipe, the length of the pipe 30 is typically in the order of two kilometres, and the cable 23 of similar length. If the pipe is to remain in a substantially linear configuration, it is thus necessary to provide support along the length of the cable 23. In the exemplary embodiment shown, this role is fulfilled by buoyancy elements 90.

The buoyancy elements 90 may also be so disposed as to play a role in the deployment of the pipe at a final destination, such that said pipe assumes a particular attitude in the water, and may either be detached after the installation process is complete, or may remain attached to the pipe to provide support therefor.

Figure 4:
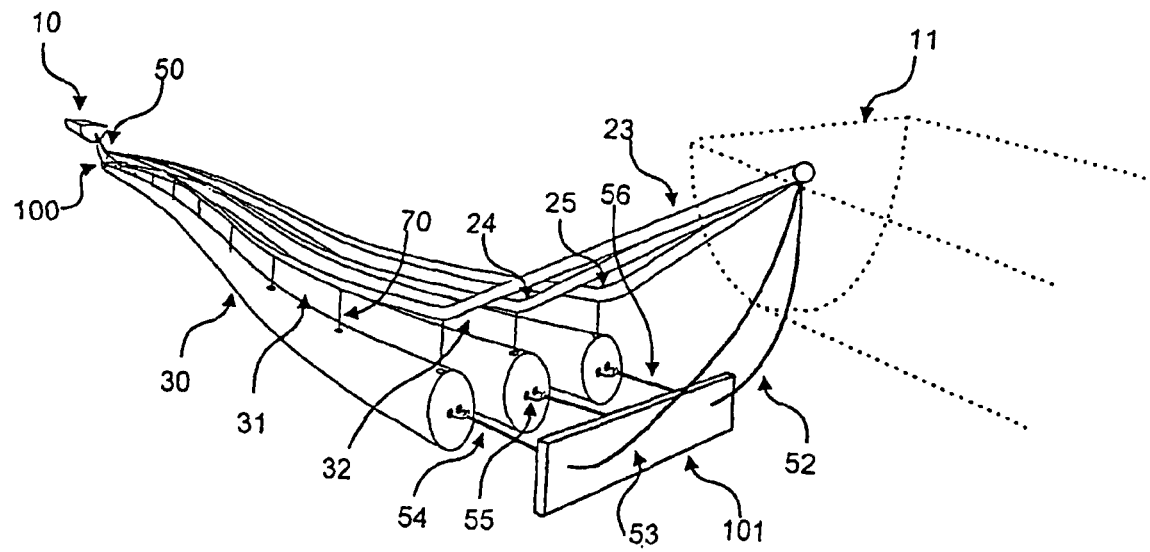
FIG. 4 is a perspective view of a third embodiment of the present invention.

FIG. 4 shows a third embodiment according to the present invention. In this embodiment, there are provided three pipes 30, 31, and 32, arranged in a horizontal plane parallel to each other, and each provided with and suspended from a cable 23, 24, 25, suspended between a first and second surface vessel 10 and 11 respectively. There are further provided spacer elements 100, 101, at the first and second end of the pipes 30, 31 and 32, where each end of each of the pipes 30, 31, and 32 is connected to one of said spreader elements 100, 101, such that the pipes are retained in a substantially horizontal plane, in a substantially parallel manner. This spacer element is connected by means of tethers 52 and 53 to the surface vessel 11. Each end of each of the pipes 31, 32 and 33 is connected to a respective one of the surface vessels 10, 11 by tethers 54, 55, 56 and the spreader elements 100, 101. The tethers 54, 55 and 56 are not under tension but are provided to assist monitoring of the towing process, and to prevent loss of the pipe in the event of damage or failure of one of more of the clamps attaching the pipe to the cable. The tethers or guide wires 54, 55 and 56 may further be used by an ROV in transferring the control of the pipe to the installation vessel or host vessel.

Figure 5:
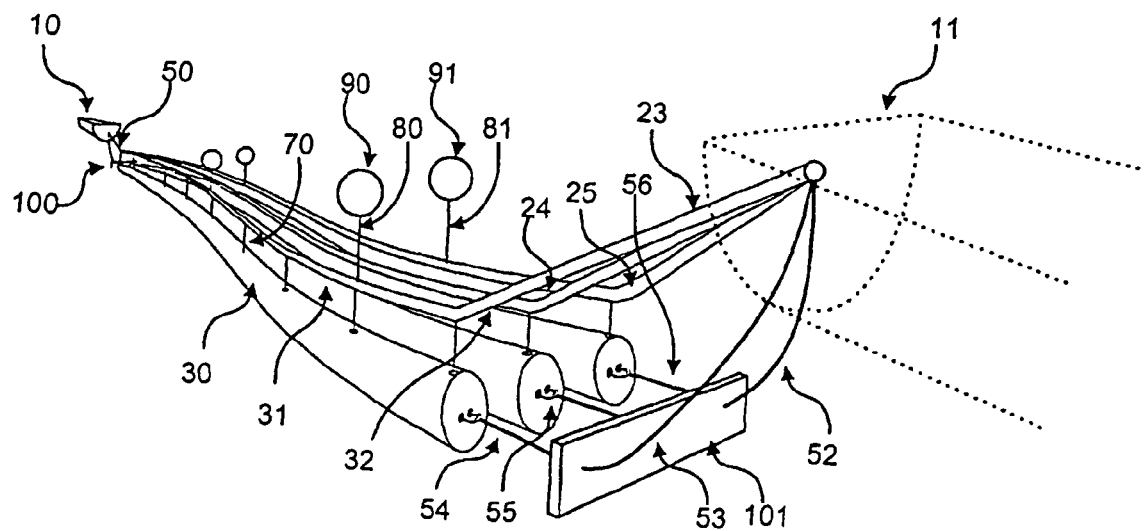
FIG. 5 is a perspective view of a fourth embodiment according to the present invention.

FIG. 5 shows a fourth embodiment of the present invention which comprises all elements of the third embodiment, and further comprises buoyancy elements 90, 91 connected to the cables 23, 24 by tethers 80, 81 such that the cables are supported along their length, such that the pipe remains in a substantially linear formation.

Figure 6:
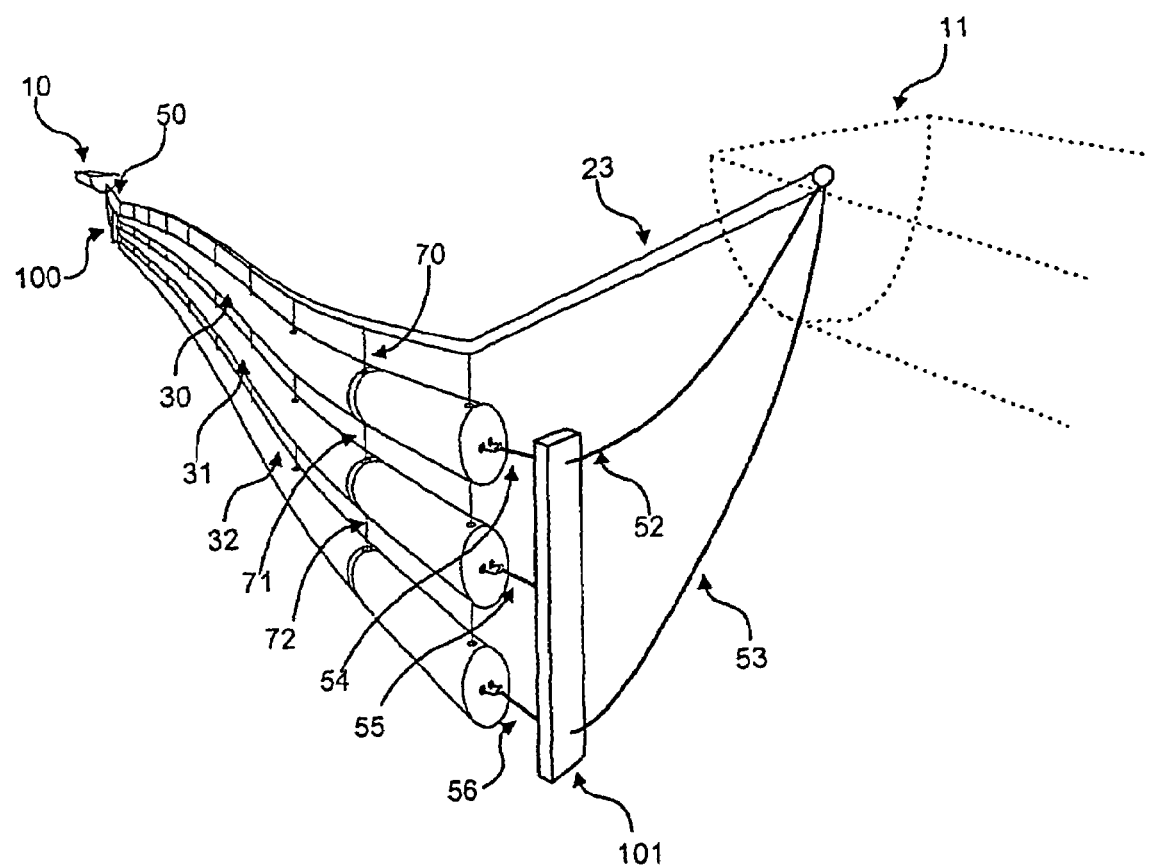
FIG. 6 is a perspective view of a fifth embodiment according to the present invention.

FIG. 6 shows a fifth embodiment of the present invention. In this embodiment there are provided three pipes 30, 31 and 32, arranged in a vertical plane, and disposed underneath and suspended from, a single cable 23 which is suspended between a first and second surface vessel 10 and 11. The three pipes 30, 31 and 32 are connected one to another by further tethers 71, 72 respectively. Each end of each of the pipes 31, 32 and 33 is connected to a respective one of the surface vessels 10, 11 by spreader elements 100, 101 connected to the pipes by tethers 54, 55, 56. The tethers 54, 55 and 56 are not under tension but are provided to assist monitoring of the towing process, and to prevent loss of the pipe in the event of damage or failure of one of more of the clamps attaching the pipe to the cable. The tethers or guide wires 54, 55 and 56 may further be used by an ROV in transferring the control of the pipe to the installation vessel or host vessel.

Other configurations of a plurality of pipes suspended from one or more cables may easily be envisaged by the skilled person on the basis of the above teaching. It may also be found to be desirable to provide buoyancy means along the length of the pipe so as to provide support, for example as described with relation to the embodiment of FIG. 3.

Figure 7:
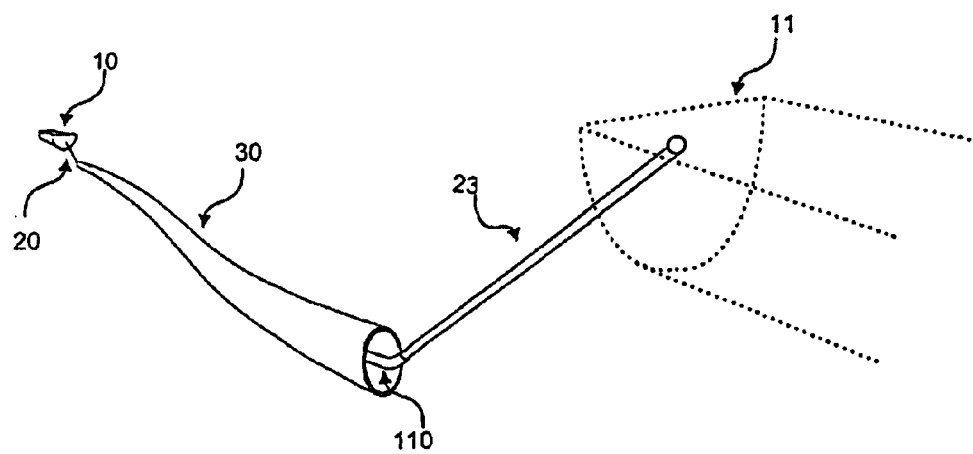
FIG. 7 is a perspective view of a sixth embodiment according to the present invention.

FIG. 7 shows a sixth embodiment of the present invention. In this embodiment, there is provided a pipe 30, and a cable 23 suspended between two surface vessels 10 and 11. Rather than the pipe 30 being suspended from the cable 23, in this embodiment of the present invention the cable 23 passes through the pipe 30, such that the pipe is supported from inside. The cable 23 is advantageously provided with a protective sleeve 110, which reduces frictional coupling between the pipe 30 and the cable 23, as well as protecting both of these elements.

The sleeve 110 may comprise an extruded sheath or tape, designed to protect the internal layer of the pipe over which the pipe is placed. Spacers may be used to keep the cable in the centre of the pipe. These spacers may comprise an elastomeric or foam type material, for example a material similar to that used in the pigging of pipelines. These spacers may act as centralisers.

Figure 8:
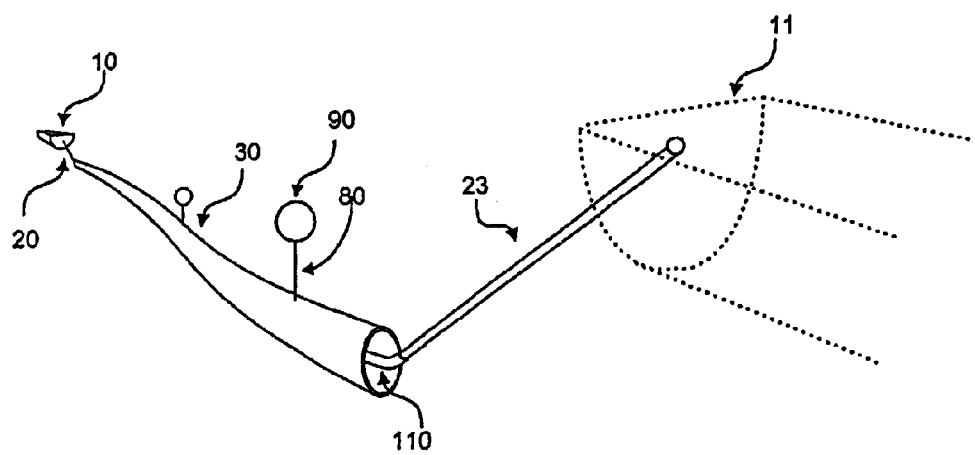
FIG. 8 is a perspective view of a seventh embodiment according to the present invention.

FIG. 8 shows a seventh embodiment of the present invention. According to this embodiment, there are provided elements according to the sixth embodiment of the present invention as described above, and additionally buoyancy elements 90, connected to said pipe 30 via tethers 80, so as to provide support along the length of the pipe 30 such that it retains a substantially linear configuration.

It will be understood that in all of the above-described embodiments, the pipe may comprise flexible or rigid type piping, or any hybrid thereof or other arrangement. It may also be advantageous to allow for cables without any ancillary components, or with ancillary components, such as those that may be used in its final installed configuration or those that may be needed to aid the final installation of the pipe. The methods and apparatus described are appropriate to the transportation of pipes of all types. One of the applications to which the methods and apparatus describes is particularly well suited is the transportation of fluid hydrocarbon transport pipes, such as oil or gas riser pipes.

The use of temporary ancillary aids to support the towing process is also envisaged. Such ancillary components may comprise for example padeyes 40 and swivel to connect the pipe to the tug via tethers 20 and 21. The primary purpose of this is to avoid a torsional imbalance and allow the guide wire the degree of freedom to rotate. This is also important during the transfer of the pipe from a first to a second surface vessel, for example from a tug to an installation vessel on the pipe arriving at the installation site.

The method of towing described above can be extended to use in the installation of the pipe at sea for example as a riser pipe, or a transport pipe. Each connection between said pipe 30 and the cable 23, can be disconnected sequentially starting with the connection nearest said first or said second surface vessel, for example by means of the quick release connectors 60, where such are provided, such that one end of the riser gradually descends toward the desired location.

The buoyancy elements 90 may also be so disposed as to play a role in the deployment of the pipe at a final destination, such that said pipe assumes a particular attitude in the water, and may either be detached after the installation process is complete, or may remain attached to the pipe to provide support therefor.

The invention claimed is:

1. A method of transporting a pipe through water, the method comprising:
   i. connecting opposite ends of a towing cable to a first surface vessel and to a second surface vessel respectively;
   ii. supporting said pipe at a plurality of points along the length thereof by said cable; and
   iii. displacing said first surface vessel and said second surface vessel towards the desired destination of said pipe, such that said cable and said pipe connected thereto are towed behind said first surface vessel towards said desired destination.

2. The method of claim 1 wherein said pipe is one of a plurality of pipes also arranged according to claim 1.

3. The method of claim 2 wherein said plurality of pipes are arranged in a vertical plane parallel to the direction of movement of said first surface vessel beneath said cable.

4. The method of claim 2 wherein said cable is one of a plurality of cables disposed in a horizontal plane, and wherein each of said plurality of pipes is associated with a corresponding one of said plurality of cables.

5. The method of claim 4 wherein said plurality of pipes is retained in the proper plane by means of a spreader element, to which each of said cables is directly or indirectly connected.

6. The method of claim 4 wherein said pipe is suspended from said at least one cable, said pipe being connected at said plurality of points along the length thereof to a plurality of points along the length of the cable.

7. The method of claim 2 wherein said cable passes through said at least one pipe.

8. The method of claim 7 wherein said cable is provided with an outer sheath.

9. The method of claim 1 wherein said cable is provided with at least one buoyant element along its length.

10. The method of claim 1 wherein said cable is connected to one or both of said first surface vessel and said second surface vessel by a tether.

11. The method of claim 10 wherein said tether is connected to said cable by a padeye or swivel connection.

12. The method of claim 1 wherein said pipe is connected to one or both of said first surface vessel and said second surface vessel by a tether.

13. The method of claim 12 wherein said tether is connected to said pipe by a padeye or swivel connection.

14. The method of claim 1 wherein the opposite ends of the towing cable are connected to the first and second surface vessels such that forces arising from the movement of the vessels relative to the pipe can place the towing cable in tension at its opposite ends.

15. A method of installing a riser pipe, the method comprising:
   transporting the riser pipe through water, the step of transporting comprising:
      connecting opposite ends of a towing cable to a first surface vessel and to a second surface vessel respectively;
      supporting said riser pipe at a plurality of points along the length thereof by said cable; and
      displacing said first surface vessel and said second surface vessel towards the desired destination of said riser pipe, such that said cable and said riser pipe connected thereto are towed behind said first surface vessel towards said desired destination;
      wherein said riser pipe is suspended from said cable; and
   sequentially disconnecting each connection between said riser pipe and said cable, starting with the connection nearest said first or said second surface vessel, such that one end of the riser pipe gradually approaches the desired location.

16. An apparatus for use in towing and installing a pipe, comprising a cable, said cable having a plurality of support elements extending therefrom, said elements being provided with means adapted for securement to said pipe, said cable including connecting means at opposite ends of the cable for connecting said cable to a first surface vessel and a second surface vessel, respectively.

17. The apparatus of claim 16 wherein said support elements comprise secondary cables and said securement means are adapted to be releasably connected with said pipe.

18. The apparatus of claim 16 further comprising a sleeve which is fitted around said cable and adapted such that said cable and said sleeve fit inside said pipe, said sleeve protecting said pipe.

19. The apparatus of claim 18 wherein said support elements are arranged such that said cable is maintained in a substantially coaxial configuration with said pipe along at least a part of the length of said pipe.

20. The method of claim 16 wherein the cable and the connecting means are configured such that forces arising from the movement of the vessels relative to the pipe can place the cable in tension at its opposite ends.

* * * * *